United States Patent Office 3,386,476
Patented June 4, 1968

3,386,476
LAMINATES OF POLYETHYLENE
TEREPHTHALATE
Howard Warner Starkweather, Jr., Wilmington, Del., assignor to E. I. du Pont de Nemours and Company, Wilmington, Del., a corporation of Delaware
No Drawing. Filed July 12, 1965, Ser. No. 471,395
10 Claims. (Cl. 138—144)

ABSTRACT OF THE DISCLOSURE

A laminate for use in forming plastic pipes is produced by applying a suitable adhesive between two or more layers of a uniaxially oriented creep-resistant tape formed by extending a polyethylene terephthalate polymer, having a relative viscosity of between 25 and 80, to at least five times its original length.

---

This invention relates to laminar constructions made of multiple layers of polyethylene terephthalate. Specifically, this invention relates to laminates in which the polyethylene terephthalate has been uniaxially oriented and is creep-resistant.

Polyethylene terephthalate is a well-known thermoplastic material. Its preparation is described in U.S. Patent No. 2,465,319, issued to Whinfield and Dickson. It is a polyester resin formed from ethylene glycol and terephthalic acid or dimethyl terephthalate.

The plastic tapes used in the preparation of the laminates of this invention have been prepared by extending them to their non-destructive limit. This may be accomplished by rolling an extruded billet as described in U.S. application Ser. No. 275,480 by Dunnington and Fields, or by stretching a sheet to its extensible limit and then heat setting the sheet by heating the stretched sheet to a temperature between 150° C. and 240° C. while holding the sheet under sufficient tension that it cannot shrink.

In order to prepare laminar constructions using the highly oriented films, it is necessary to employ a non-solvent adhesive, that is, an adhesive which does not dissolve and thus disorient the plastic tape. In addition, the adhesive must be such that it can be activated at a temperature less than the temperature at which the tapes would become disoriented, specifically, in the case of polyethylene terephthalate, at a temperature of less than 220° C., and preferably less than 150° C.

Since the laminar constructions of this invention can be in various forms, different techniques are used in preparing different laminar constructions, but, in general, the processes consist of coating the oriented tapes with a non-solvent adhesive and then subjecting multiple coated tapes to sufficient heat to render the adhesive active. Alternatively, the laminates may be formed by applying the adhesive as a separate film between two of the highly oriented creep-resistant tapes and then applying sufficient heat to activate the adhesive.

When the laminar construction of this invention is in the form of a pipe, it is necessary that the tapes be applied to a removable mandrel or to a cylindrical hollow core. The coated highly oriented tape is helically wound around the mandrel or core. Heat may be applied to the pipe construction as it is being formed, or the pipe may be fully wound and then heated to a temperature sufficient to activate the adhesive.

The tapes useful in making the laminates of this invention are resistant to longitudinal splitting; thus, a tape to be useful in the formation of the laminates must be able to withstand an elongation of at least 50% in the direction transverse to the direction of orientation. Whether or not a tape is resistant to longitudinal splitting is related to the molecular weight of the polymer used to form the tape. The molecular weight of polyethylene terephthalate can be measured by relative viscosity, and if the polymer has a relative viscosity of between 25 and 80 as measured in an 8.7% solution of polymer in a solvent consisting of 10 parts phenol and 7 parts trichlorophenol, a tape formed from this polymer by extension to at least 5 times its original length will have the resistance to longitudinal splitting required.

The tapes useful in making the laminates of this invention are creep-resistant. Creep-resistant tapes of polyethylene terephthalate are obtained by extending a billet from 5 to 7 times the original length. The term "creep-resistant" as used herein means that the tape when subjected to a tensile force in the direction of elongation of 35,000 pounds per square inch at room temperature for 24 hours will extend less than 3.5% and will exhibit substantially no further growth when such tension is maintained for an indefinite length of time thereafter. In addition to extending the film 5 to 7 times its length, it is also necessary when the film is prepared by a stretching technique to heat set the film by raising its temperature to above 150° C. and below 240° C., while preventing the film from shrinking by maintaining it under tension.

When the tapes are prepared by a rolling technique, such as described in the Dunnington and Fields application, it is usually unnecessary to heat set the tape because the rolling technique inherently heats the film to above 90° C.

In order to insure that the tapes will adhere sufficiently to the adhesive, it is usually desirable to treat the surface of the tape by an abrasion technique. Suitable abrasion techniques are known in the art and machines useful for carrying out the technique are commercially available. U.S. Patent No. 3,067,021 to Pelley et al. discloses a suitable machine and process.

Suitable hot melt adhesives for use in the preparation of the laminates of this invention which are non-solvents for the highly oriented tapes include polyethylene, nylon copolymers produced by the method of Example 3 of U.S. Patent 2,467,186, issued to T. Cairns, which copolymers are prepared from a mixture containing 35.5 parts hexamethylene diammonium adipate, 26.5 parts hexamethylene diammonium sebacate, and 38 parts caprolactam, polyesters such as polyethylene isophthalate, polyethylene hexahydroterephthalate, copolymers of ethylene terephthalate and ethylene isophthalate, copolymers of ethylene terephthalate and ethylene sebacate, copolymers of ethylene terephthalate and ethylene hexahydroterephthalate and copolyesters of ethylene terephthalate, ethylene isophthalate and ethylene hexahydroterephthalate.

The laminar constructions of this invention which are in the form of flat laminates, angled laminates or channeled laminates may be prepared by placing the tapes coated with a suitable hot melt adhesive between two pressure plates and applying sufficient heat to activate the adhesive. As previously stated, when using polyethylene terephthalate tape the heat preferably is less than 150° C. in order that the tapes will not shrink excessively, lose their creep-resistant qualities, and/or become embrittled. It is, of course, necessary when preparing angled laminated and channeled laminates that the pressure plates be in a channeled form or an angle form. The highly oriented tapes used in the preparation of these laminates have a thickness of between 2 and 30 mils, while the adhesive layer has a thickness of between .5 and 10 mils. Of course, the adhesive layer may be applied as a separate film between the highly oriented polyethylene terephthalate. It is desirable that the minimum amount of heat necessary to activate the hot melt adhesive be employed and that the heat be appled for a minimum time.

When the laminates of this invention are in the form of pipe, it is necessary to employ a mandrel and/or a hollow cylindrical core. The highly oriented film is applied to the mandrel and/or core by helicaly winding the fim onto the core or mandrel. In order to obtain a smooth pipe with maximum strength, it is desirable that each layer of film be wound in a laterally abutting fashion, and that succeeding layers of the same handedness have about a 50% overlap with the previous layer. As in the production of the flat, angular, or channeled laminates, it is desirable to use a minimum amount of heat applied for a minimum length of time. This can be readily achieved in the case of pipes by applying a methane flame to the adhesive coated highly oriented film as it is being applied to the core or to the previously applied layers. In the preferred embodiment, the highly oriented films are applied to the mandrel or core two at a time and of the same helical twist followed by the application of two additional layers of the opposite helical twist. As an alternative to applying the methane flame to the adhesive coated films as they are applied to the core or mandrel, thermal radiation may be applied through a layer of the oriented tape to heat the adhesive; for example, polyethylene terephthalate may be coated on one surface with a carbon black filled polyethylene, and a single layer of this taped wrapped coated side down on a core; the single layer could then be subjected to infrared radiation which woul pass through the polyethylene terephthalate tape but would heat and activate the polyethylene; additional layers would then be applied in the same manner. Heated gas and similar energy sources could be used to heat the coating in generally the same manner that the methane flame is employed, of course. The entire pipe may be formed and the tapes held in place by suitable clamps and then heated to a temperature sufficient to activate the non-solvent adhesive. As in the case with the flat, angular, or channeled laminates, it is unnecessary to use coated highly oriented tapes and instead a separate film adhesive layer may be employed. The thicknesses of the highly oriented tapes and of the adhesive layers may be the same as those employed in the preparation of flat, angular, or channeled laminates. Since it is desirable that each layer of tape be wound in a laterally abutting fashion at predetermined helix angles, it is frequently necessary to make adjustments in the width of the tape used from layer to layer to compensate for the increased external diameter of the pipe due to the previously applied layer. The wrapping angles used to produce pipe with optimum strength for internal pressure loading are well known in the art; see, for example, U.S. Patent 2,907,164 to Grieve et al.

In the following examples, which illustrate the invention, all parts and percentages are in parts by weight unless otherwise specified.

EXAMPLE I

A 1.8 inch diameter mandrel was coated with four convolute wraps of 48 inches wide, 150 gauge biaxially oriented polyethylene terephthalate (commercially available). This coating was then covered with a 2.5 mil thickness sheeting of 55 parts by weight polyethylene terephthalate and 45 parts by weight polyethylene sebacate. This laminate was fused to form a liner on the mandrel by placing the mandrel in an oven for one hour at 175° C. The mandrel with the liner still in place was then wrapped with four successive layers of the creep-resistant, polyethylene-coated polyethylene terephthalate tape in a butted helix. The polyethylene of the coating had a density of .92 and a melting point of about 115° C. The tapes were 3.26 inches wide. The helices of the first two layers were wrapped with the same handedness with the tape displaced in the second layer so that the helical seam of the first layer was covered by the axial middle of the second layer (50% overlap). The tapes of the succeeding two layers were wrapped with opposite handedness to those in the first two layers and with a 50% overlap. The tapes were clamped in place and the entire structure placed in an oven at 135° C. After one hour, the composite was removed from the oven and the mandrel removed. The resulting pipe which had an outside diameter of 1.94 inches and a wall thickness of 100 mils withstood a pressure in excess of 3000 pounds per square inch on a short term burst test (ASTM D–1599–58T). And after 6000 hours on steady pressure test (ASTM D–1598–63T) at room temperature and 1200 pounds per square inch, the pipe had undergone 2.0% increase in circumference and 0.9% increase in length.

EXAMPLE II

An extruded low density (0.93) polyethylene tube was slipped over a mandrel and wrapped with four layers of low density polyethylene-coated creep-resistant polyethylene terephthalate tape of the type set forth in Example I. The tapes were 3.25 inches wide and the lay angles of the butted helices were approximately 57 degrees. The tapes were fused to one another and to the liner by rotating the mandrel and playing a methane air flame against the tape as it was wound on the substrate. The mandrel was then removed. The resultant pipe measured 1.93 inches in outside diameter and 103 mils in wall thickness. It was tested on a short term burst test to failure by tape rupture at 3200 pounds per square inch internal pressure. After 6,500 hours on a steady pressure test at room temperature and a pressure of 1000 pounds per square inch, the pipe increased in circumference about 2.1% and in length about 1.1%.

EXAMPLE III

A length of pipe was prepared as described in Example II with the exceptions that a sheath of intermediate density polyethylene (0.935) was extruded over the outer wrap of tape and that the tapes employed consisted of 3 mils of creep-resistant polyethylene terephthalate coated on both sides with 2 mils of low density polyethylene (0.93) having a melting point of 115° C. The tapes used were 3.19 inches wide and the lay angles of the butted helices were about 55 degrees. The resultant pipe measured 1.90 inches outside diameter and 105 mils in wall thickness. On short term burst test the sample ruptured at a pressure of 900 pounds per square inch. After 4000 hours on a steady pressure test, at a pressure of 3000 pounds per square inch at room temperature, the pipe increased in circumference 2.6% and in length 0.8%. Under cyclic pressure loading at room temperature, this pipe withstood 4,600,000 cycles of 0 to 300 pounds per square inch internal pressure without failure.

EXAMPLE IV

A length of pipe was prepared as described in Example II with the exception that 8 layers of creep-resistant polyethylene terephthalate were employed. The tapes in the first four layers were 3¼ inches wide, and the tapes in the fifth through eighth layers were 3⅜ inches wide. The lay angle was about 55 degrees. Each layer consisted of 8 mils of polyethylene terephthalate coated on both sides with 0.5 mil of a polyester adhesive consisting of 55 parts by weight polyethylene terephthalate and 45 parts by weight polyethylene sebacate. The diameter of the pipe was 2.06 inches, and the wall thickness was 178 mils. The pipe ruptured on a short term burst test at a pressure of 3500 pounds per square inch. After 3000 hours at steady pressure at room temperature, the pipe increased in circumference 2.6% and in length 1.5%.

EXAMPLE V

A length of pipe was prepared as described in Example II with the exception that 8 layers of creep-resistant polyethylene terephthalate were employed, the surfaces of which had been roughened by matte abrasion prior to extrusion coating a two mil thickness of low density polyethylene on each side. The tapes used in the first four layers applied were 3.28 inches wide and the tapes used in the fifth through eighth layers were 3.50 inches wide. The lay angles of the resultant butted helices were about 54°. The pipe was sheathed by wrapping and fusing on two layers of intermediate density polyethylene tape (0.935) in the same general way that the creep-resistant tapes were applied. The diameter of this pipe was 2.07 inches and the wall thickness was 183 mils. On short term burst test this pipe ruptured at 3500 pounds per square inch. On steady pressure test the pipe grew 2.0% in diameter and 0.8% in length after 2000 hours at room temperature and 1200 pounds per square inch internal pressure.

EXAMPLE VI

A creep-resistant polyethylene terephthalate tape 25 mils thick and 1.5 inches wide was obtained by rolling a billet to six times its original length, in accordance with the teachings of the Dunnington and Fields application Ser. No. 275,480, made from polyethylene terephthalate having a relative viscosity of 29. This tape had a flexural modulus of 1,650,000 pounds per square inch. Six layers of this tape were laminated with a commercially available polyester adhesive consisting of 55 parts by weight polyethylene terephthalate and 45 parts by weight polyethylene sebacate. The adhesive was applied as a 2 to 4 mil coating to the tapes. The layers were clamped in a jig and heated in an oven for one hour at 170° C. The laminate was then cooled to room temperature and removed from the jig. The laminate had a flexural modulus of 1,540,000 pounds per square inch. After loading in flexure for 10,000 hours under an outer fiber stress of 15,000 pounds per square inch, the apparent modulus was 650,000 pounds per square inch. The laminate had a compressive modulus parallel to the direction of tape orientation of 264,000 pounds per square inch, a compressive modulus parallel to the transverse direction of 171,000 pounds per square inch, and a compressive modulus parallel to the thickness of 60,500 pounds per square inch. The compressive measurements were obtained using ASTM Method D-695-54.

EXAMPLE VII

A laminate was made from ten layers of creep-resistant polyethylene terephthalate, made by stretching a film to 5.5 times its original length, and then heat setting at 180° C. under sufficient tension to avoid any shrinkage, which had been coated with low density polyethylene (0.93). The total thickness of the tape and the coating was .022 inch of which .017 inch was the creep-resistant tape. The flexural modulus of the coated tape was 1,450,000 pounds per square inch. The layers were clamped together and heated at 125° C. for one hour. On cooling to room temperature and removal of the clamps, the flexural modulus of the laminate was found to be 1,156,000 pounds per square inch, bending in the machine direction, and 300,000 pounds per square inch, bending in the transverse direction. After loading in flexure under an outer fiber stress of 15,000 pounds per square inch for 2,265 hours, the apparent modulus was 460,000 pounds per square inch. The laminate had a flexural strength in the machine direction of 21,300 pounds per square inch and 10,600 pounds per square inch in the transverse direction. The laminate had a compressive modulus of 578,000 pounds per square inch in the machine direction and 219,000 pounds per square inch in the transverse direction, and a compressive strength of 13,300 pounds per square inch in the machine direction and 11,200 pounds per square inch in the transverse direction. The compressive measurements were obtained using ASTM Method D-695-54. The flexural measurements were obtained using ASTM Method D-790-59T.

EXAMPLE VIII

An angular laminate was prepared from ten layers of creep-resistant polyethylene terephthalate tape coated with low density polyethylene having a width of 3.5 inches, as described in Example VII, by clamping the ten layers between two right-angled metal strips and heating the composite to 125° C. for one hour. The laminate was then removed from the metal angles and trimmed to form a right-angle having one-inch widths. The laminate had a flexural modulus of 518,000 pounds per square inch as measured by ASTM Method D-790-57T, modified by standard equations to calculate the moment of inertia of an angled member. Such standard equations are found in Mechanical Engineering Handbook, by Lionel S. Mark, 5th edition, 1951, McGraw-Hill Book Company.

EXAMPLE IX

A laminate having a channel cross-section was prepared by placing ten polyethylene terephthalate tapes coated with low density polyethylene under an electrically heated aluminum block. The tapes were 3.5 inches wide; the aluminum block was one inch square; the tapes were forced to conform to the shape of the block by a mechanical clamp. The block was then heated to 125° C. for one hour. The laminate was then removed and trimmed to form a channel laminate having internal dimensions of one inch on three sides. The laminate had a flexural modulus of 663,000 as determined by ASTM Method D-790-57T, modified by standard mechanical engineering equations for a channel.

EXAMPLE X

Creep-resistant polyethylene terephthalate tape was coated with a commercially available polyester adhesive consisting of 55 parts by weight polyethylene terephthalate and 45 parts by weight polyethylene sebacate, and was wrapped seven and one-half times around 2.5 inches diameter metal cylinder and heated for one hour at 160° C. The resulting cylinder was cut into rings having a flexural modulus of 760,000 pounds per square inch. The average thickness of the wall of the cylinder was 91 mils. The laminate had a flexural strength of 46,000 pounds per square inch. The flexural measurements were obtained using standard mechanical engineering equations.

I claim:

1. A laminate comprising at least two layers of uniaxially oriented longitudinally split-resistant, creep-resistant tape of polyethylene terephthalate, and an interlayer of adhesive between the at least two layers, said adhesive being an extensible tough layer which is a nonsolvent for the tape and which does not disorient said tape.

2. The laminate of claim 1 in which the tapes have a thickness of 2 to 30 mils, and in which the adhesive has a thickness of between 0.5 mil and 10 mils, and in which the adhesive is selected from the class consisting of polyethylene and a polyester copolymer having a melting point of less than 150° C.

3. The laminate of claim 2 in which the tapes have a matte surface.

4. The laminate of claim 1 in which the tape is polyethylene terephthalate having a relative viscosity of between 25 and 80, measured as an 8.7% solution in a solvent consisting of 10 parts by weight phenol and 7 parts by weight trichlorophenol.

5. The laminate of claim 1 in the form of a pipe.

6. The laminate of claim 1 in the form of a pipe in which the pipe also comprises a hollow cylindrical core around which are wound the tape layers.

7. A pipe comprising a hollow cylindrical core around which are wound at least two layers of a uniaxially oriented longitudinally split-resistant, creep-resistant tape of polyethylene terephthalate and an interlayer between the at least two layers that is extensible, tough and a nonsolvent for the tape and which does not disorient said tape.

8. The pipe of claim 6 in which there are four layers of tape wound on the hollow cylindrical core and in which two of the layers are wound with a right-hand helical twist and in which two layers are wound with a left-hand helical twist.

9. The pipe of claim 8 in which the layer adjacent the core and the layer next adjacent the layer adjacent the core are of the same hand.

10. The pipe of claim 8 in which the tapes are laterally abutted with a 50% overlap in succeeding layers.

References Cited

UNITED STATES PATENTS

| | | | |
|---|---|---|---|
| 2,865,765 | 12/1958 | Allen | 161—231 X |
| 2,876,067 | 3/1959 | Nagel et al. | |
| 2,961,365 | 11/1960 | Sroog. | |
| 3,037,529 | 6/1962 | Hancik | 138—144 X |

LAVERNE D. GEIGER, *Primary Examiner.*

C. L. HOUCK, *Assistant Examiner.*